United States Patent

Morita et al.

Patent Number: 5,530,075
Date of Patent: * Jun. 25, 1996

[54] CURABLE RESIN COMPOSITION

[75] Inventors: Yoshitsugu Morita, Chiba; Noriyasu Yokoyama, Tokyo, both of Japan

[73] Assignee: Dow Corning Toray Silicone Co., Ltd., Tokyo, Japan

[*] Notice: The term of this patent shall not extend beyond the expiration date of Pat. No. 5,310,843.

[21] Appl. No.: 290,574

[22] Filed: Aug. 15, 1994

Related U.S. Application Data

[63] Continuation of Ser. No. 43,247, Apr. 6, 1993.

[30] Foreign Application Priority Data

Apr. 21, 1992 [JP] Japan ................... 4-128081

[51] Int. Cl.$^6$ .................................. C08L 83/00
[52] U.S. Cl. .................. 525/431; 525/393; 525/398; 525/416; 525/422; 525/445; 525/446; 525/452; 525/472; 525/474; 525/476; 525/410
[58] Field of Search ............................ 525/476, 393, 525/431, 474, 398, 416, 472, 452, 422, 445, 446, 410

[56] References Cited

U.S. PATENT DOCUMENTS

| | | | |
|---|---|---|---|
| 3,455,877 | 7/1969 | Plueddemann | 528/25 |
| 4,370,358 | 1/1983 | Hcyer et al. | 427/54.1 |
| 4,663,397 | 5/1985 | Morita et al. | 525/398 |
| 4,707,531 | 11/1987 | Shirahata | 528/12 |
| 4,880,882 | 4/1989 | Morita et al. | 525/446 |
| 4,946,921 | 8/1990 | Shiraheta et al. | 528/39 |
| 5,082,891 | 1/1992 | Morita et al. | 524/481 |
| 5,158,991 | 10/1992 | Riding | 522/172 |
| 5,310,843 | 5/1994 | Murita | 528/15 |

FOREIGN PATENT DOCUMENTS

| | | |
|---|---|---|
| 541988 | 5/1993 | European Pat. Off. . |
| 145942 | 11/1981 | Japan . |
| 136816 | 11/1981 | Japan . |
| 58425 | 2/1985 | Japan . |
| 4-080225 | 3/1992 | Japan . |
| 5-078450 | 3/1993 | Japan . |

*Primary Examiner*—Ralph H. Dean
*Attorney, Agent, or Firm*—Sharon K. Severance

[57] ABSTRACT

The instant invention pertains to a curable resin composition comprised of A) 100 parts by weight curable resin, and B) 0.1–500 parts by weight of an organopolysiloxane having organic groups that contain epoxy groups, which is expressed by the formula:

$$(R^2SiO_{1/2})_a(R^3SiO_{1/2})_b(SiO_{4/2})_c$$

with $R^1$ substituents on the first two units wherein $R^1$ is a univalent hydrocarbon group excluding alkenyl groups, $R^2$ is a hydrogen atom or a univalent hydrocarbon group excluding alkenyl groups, $R^3$ is an alkoxysilylalkyl group or an organic group that contains epoxy groups, a is 0 or a positive integer, b is a positive integer and c is a positive integer, where a/c has the value of 0 to 4, b/c has the value of 0.05 to 4 and (a+b)/c has the value of 0.2 to 4. The curable resin composition of the instant invention has superior flowability that produces a hardened resin with superior flexibility and adhesion.

9 Claims, No Drawings

CURABLE RESIN COMPOSITION

This is a continuation of application Ser. No. 08/043,247 filed on Apr. 6, 1993.

BACKGROUND OF THE INVENTION

Resins obtained when curable resin compositions harden are known to have superior electrical characteristics pertaining to dielectric characteristics, low volume resistivity and insulating strength. In addition, these resins have superior mechanical properties including bending strength, compression strength and shock strength. These resins are used as adhesives and sealing resins for electrical and electronic elements and as FRP resins. The resins obtained by curing curable resin compositions are generally rigid and have poor flexibility. In addition, because the setting shrinkage ratio is large, stresses are placed on the electrical or electronic elements when the resin is used as a sealing resin for electrical or electronic elements. Consequently, cracking occurs in the hardened resin, or the electrical or electronic element cracks, or spaces develop between the hardened resin and the electrical or electronic element due to poor adhesion between the hardened resin and the electrical or electronic element. In addition, curable resin compositions form hardened resins that have large thermal expansion coefficients in comparison to the thermal expansion coefficients of electrical or electronic elements. Thus, when the resin-sealed electrical or electronic elements undergo a heat cycle, large stresses are placed on the electrical or electronic elements, and cracking occurs in the hardened resin, or spaces arise between the hardened resin and the electrical or electronic elements due to poor adhesion between the hardened resin and the electrical or electronic elements. Moreover, there have been problems with deterioration of the resin-sealed electrical or electronic elements due to ingress of water through cracks produced by shrinkage of the curable resin composition during setting, by expansion and shrinking due to heating, or due to the development of spaces between the hardened resin and the electrical or electronic elements.

Thus, various curable resin compositions have been offered whereby the flexibility of the resin is improved in order to lessen the stresses that occur during setting and whereby adhesion of the hardened resin with the electrical or electronic element is improved. Examples of compositions that have been offered include a curable resin composition comprised of a catalyst for curing, an inorganic filler, an organopolysiloxane composed of trifunctional siloxane units (T units) and bifunctional siloxane units (D units) having epoxy groups, methylphenylpolysiloxane and an epoxy resin as disclosed in Japanese Kokai Patent Application No. Sho 56[1981]-145942. Another curable resin composition is comprised of an inorganic filler, a curing agent, an organopolysiloxane composed of bifunctional siloxane units (D units), trifunctional siloxane units (T units) and monofunctional siloxane units (M units) having at least one each of an amino or epoxy group and a hydroxy group or a group that can undergo hydrolysis, and an epoxy resin as disclosed in Japanese Kokai Patent Application No. Sho 56[1981]-136816. Japanese Kokai Patent Application No. Sho 60[1985]-58425 discloses a curable resin composition comprised of a dimethylpolysiloxane having molecular side-chain epoxy groups and polyoxyalkylene groups, a phenol resin and an epoxy resin. Finally U.S. Pat. No. 4,880,882 discloses a curable resin compositions comprised of a curable resin and spherical particles of silicone rubber. However, the curable resin compositions described in Japanese Kokai Patent Application Nos. Sho 56[1981]-145942 and Sho 56[1981]-136816 necessarily use organopolysiloxanes as the bifunctional siloxane unit (D unit), and thus there is the disadvantage that the glass transition point (Tg) of the resulting hardened resin decreases, this decrease being particularly dramatic when an organopolysiloxane is used that has epoxy groups and is composed of $(CH_3)_2SiO_{2/2}$ units (D units). The curable resin compositions offered in Japanese Kokai Patent Application No. Sho 60[1985]-58425 use dimethylpolysiloxanes having molecular side-chain epoxy groups and polyoxyalkylene groups, with the result that the water absorption of the resulting hardened resin is considerable and the resin is inappropriate for use as a sealing resin for electrical and electronic elements. Moreover, although the hardened resins obtained from the curable resin compositions offered in U.S. Pat. No. 4,880,882 have superior flexibility, their flowability is poor, and thus have inferior working properties as a resin seal for electrical and electronic elements. Moreover, these hardened resins have inferior adhesion with respect to electrical and electronic elements.

The object of the present invention is a curable resin composition that has superior flowability prior to setting and produces a hardened resin with superior flexibility and adhesion after setting.

SUMMARY OF THE INVENTION

The present invention pertains to a curable resin composition, and specifically, pertains to a curable resin composition with superior flowability prior to setting which forms a hardened resin with superior flexibility and adhesion characteristics after setting.

The curable resin composition of the present invention is comprised of A) 100 parts by weight curable resin, and B) 0.1–500 parts by weight of an organopolysiloxane that has organic groups that contain epoxy groups, and that is expressed by the formula:

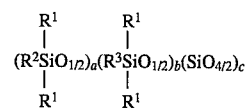

wherein $R^1$ is a univalent hydrocarbon group excluding alkenyl groups, $R^2$ is a hydrogen atom or a univalent hydrocarbon group excluding alkenyl groups, $R^3$ is an alkoxysilylalkyl group or an organic group that contains epoxy groups, a is 0 or a positive integer, b is a positive integer and c is a positive integer, where a/c has the value of 0 to 4, b/c has the value of 0.05 to 4 and (a+b)/c has the value of 0.2 to 4.

THE INVENTION

The present invention pertains to a curable resin composition comprised of A) 100 parts by weight curable resin, and B) 0.1 to 500 parts by weight of an organopolysiloxane that has organic groups that contain epoxy groups, and that is expressed by the formula:

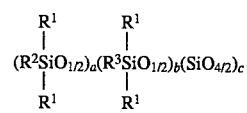

wherein $R^1$ is a univalent hydrocarbon group excluding alkenyl groups, $R^2$ is a hydrogen atom or a univalent hydrocarbon group excluding alkenyl groups, $R^3$ is an alkoxysilylalkyl group or an organic group that contains epoxy groups, a is 0 or a positive integer, b is a positive integer and c is a positive integer, where a/c has the value of 0 to 4, b/c has the value of 0.05 to 4 and (a+b)/c has the value of 0.2 to 4.

Component A is the base material of the present invention, and is a curable resin. Any conventional curable resin known in the art may be used as component A. Specific examples of this component A include, but are not limited to, phenol resins, formaldehyde resins, xylene resins, xylene formaldehyde resins, ketone formaldehyde resins, furan resins, urea resins, imide resins, melamine resins, alkyd resins, unsaturated polyester resins, aniline resins, sulfonamide resins, silicone resins, epoxy resins and copolymer resins thereof. One, two, or more types of the curable resins indicated above may be used in conjunction. Substances that are particularly desirable for use as component A are curable resins selected from a group comprising epoxy resins, phenol resins, imide resins and silicone resins.

There are no particular limitations on the means for curing component A. The curable resins may be curable resins cured by heat curable resins cured by high-energy radiation such as ultraviolet or ray, or curable resins that are cured by humidity or moisture. In addition, component A may be a curable resin that is a solid or liquid at room temperature.

Examples of components other than the aforementioned curable resins that may be added to component A include curing agents, curing accelerators, fillers, photosensitizers, higher fatty acid metal salts, ester-based waxes and plasticizers. Specific examples of curing agents include organic acids such as carboxylic acids and sulfonic acids and anhydrides thereof, organic hydroxy compounds, organic silicon compounds having groups such as silanol groups, alkoxy groups and halogen groups, and primary or secondary amino compounds. These substances may be used in combinations of one or more.

Specific examples of curing accelerators include tertiary amine compounds, organometallic compounds of, for example, aluminum or zirconium, organic phosphorus compounds such as phosphine, heterocyclic amine compounds, boron complex compounds, organic ammonium salts, organic sulfonium salts and organic peroxides.

Specific examples of fillers include glass fiber, asbestos, alumina fibers, ceramic fibers having alumina and silica as components, boron fibers, zirconia fibers, silicon carbide fibers, metal fibers, polyester fibers, aramid fibers, nylon fibers, phenol fibers, fibrous fillers such as natural plant fibers, fused silica, precipitated silica, fumed silica, fired silica, zinc oxide, fired clay, carbon black, glass beads, alumina, talc, calcium carbonate, clay, aluminum hydroxide, barium sulfate, titanium dioxide, aluminum nitride, silicon carbide, magnesium oxide, beryllium oxide, kaolin, mica, zirconia and other particle fillers and mixtures thereof.

Component B is used to improve the flexibility of the hardened resin obtained by curing the curable resin composition of the present invention, and in addition, in order to improve adhesion with respect to electrical and electronic elements. Component B is represented by the formula:

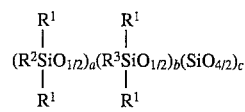

wherein $R^1$ is a univalent hydrocarbon group excluding alkenyl groups, $R^2$ is a hydrogen atom or a univalent hydrocarbon group excluding alkenyl groups, $R^3$ is an alkoxysilylalkyl group or an organic group that contains epoxy groups, a is 0 or a positive integer, b is a positive integer and c is a positive integer, where a/c has the value of 0 to 4, b/c has the value of 0.05 to 4 and (a+b)/c has the value of 0.2 to 4.

$R^1$ is a univalent organic group excluding alkenyl groups. $R^1$ may be exemplified by, but not limited to, methyl groups, ethyl groups, propyl groups, butyl groups, pentyl groups, hexyl groups, octyl groups and other alkyl groups; phenyl groups, tolyl groups, xylyl groups and other aryl groups; benzyl groups, phenethyl groups and other aralkyl groups; and chloromethyl groups, 3,3,3- trifluoropropyl groups and other substituted alkyl groups. $R^2$ is a hydrogen atom or a univalent hydrocarbon group excluding alkenyl groups. $R^2$ may be exemplified by, but not limited to, the hydrogen atom, methyl groups, ethyl groups, propyl groups, butyl groups, pentyl groups, hexyl groups, octyl groups and other alkyl groups; phenyl groups, tolyl groups, xylyl groups and other aryl groups; benzyl groups, phenethyl groups and other aralkyl groups; and chloromethyl groups, 3,3,3-trifluoropropyl groups and other substituted alkyl groups. $R^3$ is an alkoxysilylalkyl group or organic group that contains epoxy groups. $R^3$ may be exemplified by, but not limited to, organic groups that contain epoxy groups such as glycidoxyethyl groups, glycidoxypropyl groups, glycidoxybutyl groups, 3,4-epoxycyclohexylethyl groups, 3,4- epoxycyclohexylpropyl groups, 3,4-epoxynorbornenylethyl groups and 2-(3,4-epoxy-3-methylcyclohexyl)-2-methylethyl groups; and alkoxysilylalkyl groups such as trimethoxysilylethyl groups, triethoxysilylethyl groups, methyldimethoxysilylethyl groups, trimethoxysilylpropyl groups, triethoxysilylpropyl groups, trimethoxysilylbutyl groups and methyldimethoxysilylpropyl groups.

In addition, in the formula, a is 0 or a positive integer and denotes the number of monofunctional siloxane units (M units) that have no alkoxysilylalkyl groups or organic groups that contain epoxy groups. b is a positive integer and denotes the number of monofunctional siloxane units (M units) having alkoxysilylalkyl groups or organic groups that contain epoxy groups. c is a positive integer that denotes the number of tetrafunctional siloxane units (Q units). The various ratios should be such that a/c is a number in the range 0 to 4, b/c is a number in the range 0.05 to 4 and (a+b)/c is a number in the range 0.2 to 4. The number of monofunctional siloxane units (M units) cannot exceed four per each tetrafunctional siloxane unit (Q unit). In addition, in the present invention, in order for component B to have superior compatibility with component A, the number of monofunctional siloxane units (M units) having alkoxysilylalkyl groups or organic groups that contain epoxy groups must be at least 0.05 per each tetrafunctional siloxane unit (Q unit).

Component B organopolysiloxane may be a liquid or solid at room temperature, and although there are no particular restrictions on the molecular weight thereof, a molecular weight in the range 500–500,000 is desirable from the standpoint of favorable compatibility with component A.

In the present invention, component B organopolysiloxane has alkoxysilylalkyl groups or organic groups that contain epoxy groups, and by introducing these into component A resin matrix, the flexibility of the resulting hardened resin is improved, and because component B is composed of $SiO_2$ units (Q units), the glass transition temperature (Tg) of the resulting hardened resin does not decrease and the advantages of superior heat resistance and flame resistance are obtained.

Component B organopolysiloxane described above can be obtained, for example, by an adduct reaction between an organopolysiloxane having hydrogen atoms bonded to silicon atoms expressed by the formula:

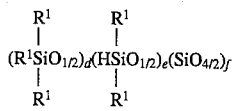

and an organic compound having epoxy groups and aliphatic unsaturated bonding with a freely-determined amount of alkoxysilylalkene in the presence of a catalyst for hydrosilylation reactions; wherein $R^1$ is a univalent hydrocarbon group excluding alkenyl groups, d is 0 or a positive integer, e is a positive integer, and f is a positive integer, where d/f has the value of 0 to 4, e/f has the value of 0.05 to 4 and (d+e)/f has the value of 0.2 to 4.

The blend amount of component B is 0.1–500 parts by weight per 100 parts by weight component A, with 0.5–100 parts by weight being preferred. If the blend amount of component B is less than 0.1 parts by weight with respect to 100 parts by weight component A, stress decrease in the hardened resin will not be manifested, and if 500 parts by weight are exceeded, the mechanical strength of the hardened resin will decline dramatically.

The curable resin composition of the present invention is obtained by uniformly mixing component A and component B. There are no particular limitations on the method for mixing component A and component B; specifically, a method may be used whereby component B is mixed directly into component A, or a method may be used wherein component B is blended at the time component A is prepared, and after premixing, the additives such as the filler are blended into component A, or a method may be used whereby the various additives that are blended into component A are sequentially blended into component B. There are no particular restrictions on the apparatus used for blending component A and component B. The mixing apparatus is selected on the basis of the various states in which component A or component B is mixed, for example, liquid, solid or powder, and specific examples include uniaxial or biaxial continuous mixers, double rollers, Ross mixers and kneader mixers.

The curable resin composition of the present invention has superior flowability prior to curing, and thus can be used in transfer molding, injection molding, potting, casting, powder coating, and immersion application and dropwise application methods. In addition, because the curable resin composition of the present invention produces a hardened resin with superior flexibility and adhesion after setting, it may be used as an adhesive or as a curable resin composition for sealing electrical and electronic elements.

So that those skilled in the art can understand and appreciate the invention taught herein, the following examples are presented, being it understood that these examples should not be used to limit the scope of this invention found in the claims attached hereto.

In the examples, the viscosity values were determined at 25° C. and the various characteristics of the curable resin composition and hardened resin were measured by the methods described below.

Spiral flow: Measured by a method based on EMMI standard.

Molding shrinkage: Measured by the method standardized in JIS-K-6911.

Thermal expansion: Measured using a thermal expansion gage (DL-7000, manufactured by Shinkuriko) with a molded hardened resin of dimensions 5 mm×5 mm×16 mm. The value for the thermal expansion is determined over a temperature range from room temperature to the glass transition temperature.

Glass transition temperature (Tg): Determined by thermal expansion measurement.

Flexural elasticity: Measured by the method standardized in JIS-K-6911.

Water absorption: A hardened resin sample molded to dimensions 2"×0.5"×0.25" is heated to a temperature of 121° C. at 100% humidity and after humidification for 20 hours, the increase in weight of the hardened resin is measured.

Burr: The length of burr is determined using a groove with a depth of 20 ϕm.

Adhesion: A curable resin composition is sandwiched between a 42 alloy plate and a copper plate, and after hardening, the adhesion is evaluated in terms of 0 (favorable) or X (unfavorable) when the hardened resin is peeled.

Thermal shock resistance: 20 resin-sealed semiconductor elements of chip size 36 $mm^2$ and package thickness 2.0 mm are produced and a heat cycle test is carried out by heating and cooling between −196° C. and +150° C. over 1 min intervals. The surface of the sealing resin is observed with a stereoscopic microscope after 150 cycles and cases in which the number of molded articles with cracked surfaces is 5 or less are indicated by 0, cases in which the number is 6–10 are indicated by Δ and cases in which the number is 11 or more are indicated by X.

Solder heat resistance: 20 resin-sealed semiconductor elements of chip size 36 $mm^2$ and package thickness 2.0 mm are produced, and after being allowed to stand for 72 hours under conditions of 85° C. and 85% RH, the packages are immediately immersed for 1 hour in a solder bath at 240° C. and the surface of the sealing resin is observed with a stereoscopic microscope. Cases in which the number of molded articles with cracked surfaces is 5 or less are indicated by 0, cases in which the number is 6–10 are indicated by A and cases in which the number is 11 or more are indicated by X.

PREPARATION EXAMPLE 1

A brown translucent organopolysiloxane was prepared by allowing to react, in a four-necked flask equipped with an agitator, a reflux condenser and a temperature gage, an organopolysiloxane expressed by the formula:

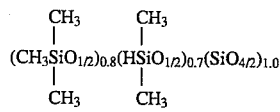

(viscosity 105 cP, containing 0.40 wt % silicon-bonded hydrogen atoms) in toluene and an allyl glycidyl ether (an excess number of moles of allyl groups in the allyl glycidyl ether with respect to the number of moles of silicon-bonded hydrogen atoms in the organopolysiloxane) in the presence of a chloroplatinic acid catalyst. The viscosity of the resulting organopolysiloxane was 520 cP and the epoxy equivalent was 420. The resulting organopolysiloxane was confirmed to be the organopolysiloxane indicated by the formula below using 1H nuclear magnetic resonance spectroscopy, 13C nuclear magnetic resonance spectroscopy and 29Si nuclear magnetic resonance spectroscopy.

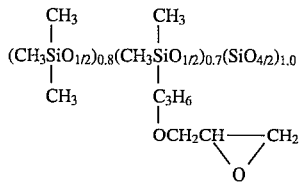

PREPARATION EXAMPLE 2

A brown translucent organopolysiloxane was prepared by allowing to react, in a four-necked flask equipped with an agitator, a reflux condenser and a temperature gage, an organopolysiloxane expressed by the formula:

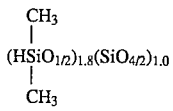

(viscosity 46 cP, containing 0.92 wt % silicon-bonded hydrogen atoms) in toluene and an allyl glycidyl ether (an excess number of moles of allyl groups in the allyl glycidyl ether with respect to the number of moles of silicon-bonded hydrogen atoms in the organopolysiloxane) in the presence of a chloroplatinic acid catalyst. The viscosity of the resulting organopolysiloxane was 610 cP and the epoxy equivalent was 370. The resulting organopolysiloxane was confirmed to be the organopolysiloxane indicated by the formula below using 1H nuclear magnetic resonance spectroscopy, 13C nuclear magnetic resonance spectroscopy and 29Si nuclear magnetic resonance spectroscopy.

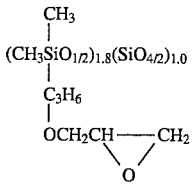

PREPARATION EXAMPLE 3

A brown translucent syrupy organopolysiloxane was prepared by allowing to react, in a four-necked flask equipped with an agitator, a reflux condenser and a temperature gage, a viscous organopolysiloxane expressed by the formula:

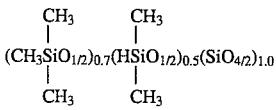

(containing 0.33 wt % silicon-bonded hydrogen atoms) in toluene and an allyl glycidyl ether (an excess number of moles of allyl groups in the allyl glycidyl ether with respect to the number of moles of silicon-bonded hydrogen atoms in the organopolysiloxane) in the presence of a chloroplatinic acid catalyst. The epoxy equivalent of the resulting organopolysiloxane was 1100. The resulting organopolysiloxane was confirmed to be the organopolysiloxane indicated by the formula below using 1H nuclear magnetic resonance spectroscopy, 13C nuclear magnetic resonance spectroscopy and 29Si nuclear magnetic resonance spectroscopy.

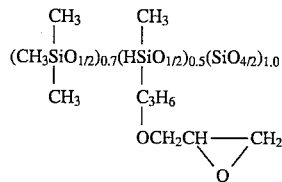

PREPARATION EXAMPLE 4

A brown translucent syrupy organopolysiloxane was prepared by allowing to react, in a four-necked flask equipped with an agitator, a reflux condenser and a temperature gage, a 68 wt % toluene solution of the viscous organopolysiloxane expressed by the formula:

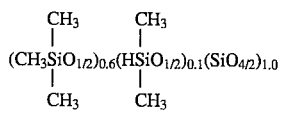

(containing 0.09 wt % silicon-bonded hydrogen atoms) and an allyl glycidyl ether (an excess number of moles of allyl groups in the allyl glycidyl ether with respect to the number of moles of silicon-bonded hydrogen atoms in the organopolysiloxane) in the presence of a chloroplatinic acid catalyst. The epoxy equivalent of the resulting organopolysiloxane was 1290. The resulting organopolysiloxane was confirmed to be the organopolysiloxane indicated by the formula below using 1H nuclear magnetic resonance spectroscopy, 13C nuclear magnetic resonance spectroscopy and 29Si nuclear magnetic resonance spectroscopy.

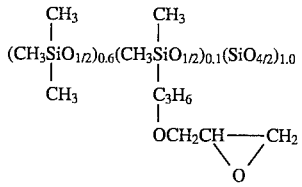

PREPARATION EXAMPLE 5

A brown translucent organopolysiloxane was prepared by allowing to react, in a four-necked flask equipped with an agitator, a reflux condenser and a temperature gage, an organopolysiloxane expressed by the formula:

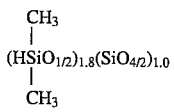

(viscosity 46 cP, containing 0.92 wt % silicon-bonded hydrogen atoms) in toluene and 1,2-epoxy-4-vinylcyclohexane (an excess number of moles of allyl groups in the 1,2-epoxy-4-vinylcyclohexane with respect to the number of moles of silicon-bonded hydrogen atoms in the organopolysiloxane) in the presence of a chloroplatinic acid catalyst. The viscosity of the resulting organopolysiloxane was 520 cP and the epoxy equivalent was 230. The resulting organopolysiloxane was confirmed to be the organopolysiloxane indicated by the formula below using 1H nuclear magnetic resonance spectroscopy, 13C nuclear magnetic resonance spectroscopy and 29Si nuclear magnetic resonance spectroscopy.

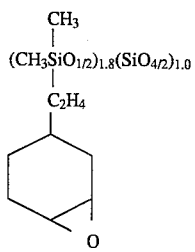

$$(CH_3SiO_{1/2})_{1.8}(SiO_{4/2})_{1.0}$$

with CH₃ and C₂H₄-cyclohexane-epoxide substituents

PREPARATION EXAMPLE 6

A brown translucent organopolysiloxane was prepared by allowing to react, in a four-necked flask equipped with an agitator, a reflux condenser and a temperature gage, an organopolysiloxane expressed by the formula:

$$(HSiO_{1/2})_{4.0}(SiO_{4/2})_{1.0}$$

with CH₃ substituents (boiling point 190° C., containing 1.22 wt % silicon-bonded hydrogen atoms) in toluene and an allyl glycidyl ether (an excess number of moles of allyl groups in the allyl glycidyl ether with respect to the number of moles of silicon-bonded hydrogen atoms in the organopolysiloxane) in the presence of a chloroplatinic acid catalyst. The viscosity of the resulting organopolysiloxane was 54 cP and the epoxy equivalent was 205. The resulting organopolysiloxane was confirmed to be the organopolysiloxane indicated by the formula below using 1H nuclear magnetic resonance spectroscopy, 13C nuclear magnetic resonance spectroscopy and 29Si nuclear magnetic resonance spectroscopy.

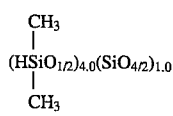

$$(CH_3SiO_{1/2})_{4.0}(SiO_{4/2})_{1.0}$$

with CH₃ and C₃H₆—OCH₂CH—CH₂ (epoxide) substituents

PREPARATION EXAMPLE 7

A yellow translucent organopolysiloxane was prepared by allowing to react, in a four-necked flask equipped with an agitator, a reflux condenser and a temperature gage, an organopolysiloxane expressed by the formula:

$$(HSiO_{1/2})_{1.8}(SiO_{4/2})_{1.0}$$

with CH₃ substituents (viscosity 46 cP, containing 0.92 wt % silicon-bonded hydrogen atoms) in toluene and equimolar amounts of an allyl glycidyl ether and an allyl trimethoxysilane (an excess number of moles of allyl groups in the allyl glycidyl ether and allyl trimethoxysilane with respect to the number of moles of silicon-bonded hydrogen atoms in the organopolysiloxane) in the presence of a chloroplatinic acid catalyst. The viscosity of the resulting organopolysiloxane was 200 cP. The resulting organopolysiloxane was confirmed to be the organopolysiloxane indicated by the formula below using 1H nuclear magnetic resonance spectroscopy, 13C nuclear magnetic resonance spectroscopy and 29Si nuclear magnetic resonance spectroscopy.

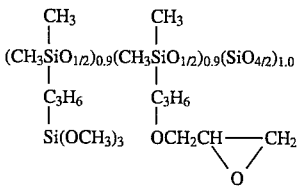

$$(CH_3SiO_{1/2})_{0.9}(CH_3SiO_{1/2})_{0.9}(SiO_{4/2})_{1.0}$$

with C₃H₆—Si(OCH₃)₃ and C₃H₆—OCH₂CH—CH₂ (epoxide) substituents

EXAMPLE 1

35 parts by weight phenol novolak resin (softening point 80° C., hydroxyl equivalent 100), 3 parts by weight organopolysiloxane prepared in Preparation Example 1, 65 parts by weight fused quartz powder, 4 parts by weight hexamethylenetetramine and 1 part by weight carnauba wax were kneaded by rollers heated to 90° C. to prepare a curable resin composition. This curable resin was pulverized and transfer molding was carried out for 3 min under conditions of 175° C. and 70 kg/cm². The hardened resin was post cured for 2 hours at 150° C. The characteristics of the resulting hardened resin are shown in Table I.

COMPARATIVE EXAMPLE 1

A curable resin composition was prepared in the same manner as in Example 1 with the exception that the organopolysiloxane shown below was in place of the organopolysiloxane prepared in Preparation Example 1. The resin was then cured as in Example 1 and the characteristics of the resulting hardened resin are shown in Table I.

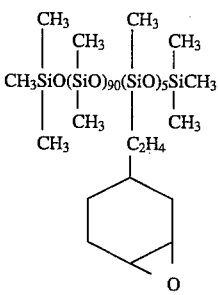

$$CH_3SiO(SiO)_{90}(SiO)_5SiCH_3$$

with CH₃ and C₂H₄-cyclohexane-epoxide substituents

COMPARATIVE EXAMPLE 2

A curable resin composition was prepared in the same manner as in Example 1 with the exception that the organopolysiloxane prepared in Preparation Example 1 was not used. The resin was cured in the same manner as in Example 1 and the various characteristics of the resulting hardened resin are shown in Table I.

TABLE I

| Characteristic | Example 1 | Comparative Example 1 | Comparative Example 2 |
|---|---|---|---|
| Spiral flow (inch) | 36 | 35 | 31 |

TABLE I-continued

| Characteristic | Example 1 | Comparative Example 1 | Comparative Example 2 |
| --- | --- | --- | --- |
| Molding shrinkage (%) | 0.22 | 0.20 | 0.31 |
| Thermal expansion ($\times 10^{-5}$/°C.) | 1.10 | 1.05 | 1.50 |
| Glass transition temperature (°C.) | 155 | 135 | 156 |
| Bending elasticity (kg/mm$^2$) | 1210 | 1250 | 1350 |
| Water absorption (%) | 0.42 | 0.55 | 0.51 |

EXAMPLE 2

2 parts by weight of the organopolysiloxane prepared in Preparation Example 2, 74 parts by weight fused quartz powder, 0.90 parts by weight aluminum acetyl acetonate and 1 part by weight carnauba wax were kneaded using rollers heated to 90° C. with a silicone epoxy resin comprised of 13 parts by weight cresol novolak epoxy resin (softening point 80° C., epoxy equivalent 220 ) and 13 parts by weight methylphenylpolysiloxane resin containing 5 wt % hydroxy groups bonded to Si atoms comprised of 10 mol % $(C_6H_5)_2SiO_{2/2}$ units, 40 mol % $C_6H_5SiO_{3/2}$ units, 10 mol % $C_6H_5(CH_3)SiO_{2/2}$ units and 40 mol % $CH_3SiO_{3/2}$ units to obtain a curable resin composition. This resin was pulverized and was subjected to transfer molding for 2 min under conditions of 175° C. and 70 kg/cm$^2$. The hardened resin was post cured at 180° C. for 12 hours. The various characteristics of the resulting hardened resin are shown in Table II.

EXAMPLE 3

A curable resin composition was prepared in the same manner as in Example 2, with the exception that the organopolysiloxane prepared in Preparation Example 3 was used in place of the organopolysiloxane prepared in Preparation Example 2. The resin was cured in the same manner as in Example 2, and the various characteristics of the resulting hardened resin are shown in Table II.

EXAMPLE 4

A curable resin composition was prepared in the same manner as in Example 2, with the exception that the organopolysiloxane prepared in Preparation Example 4 was used in place of the organopolysiloxane prepared in Preparation Example 2. The resin was cured in the same manner as in Example 2, and the various characteristics of the resulting hardened resin are shown in Table II.

COMPARATIVE EXAMPLE 3

A curable resin composition was prepared in the same manner as in Example 2, with the exception that the organopolysiloxane indicated by the formula below was used instead of the organopolysiloxane prepared in Preparation Example 2. The resin was cured in the same manner as in Example 2, and the various characteristics of the resulting hardened resin are shown in Table II.

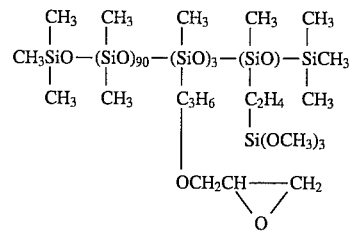

COMPARATIVE EXAMPLE 4

A curable resin composition was prepared in the same manner as in Example 2 with the exception that the organopolysiloxane prepared in Preparation Example 2 and used in Example 2 was not used. The resin was cured in the same manner as in Example 2, and the various characteristics of the resulting hardened resin are shown in Table II.

TABLE II

| Characteristic | Examples 2 | Examples 3 | Examples 4 | Comparative Examples 3 | Comparative Examples 4 |
| --- | --- | --- | --- | --- | --- |
| Spiral flow (inch) | 46 | 43 | 41 | 40 | 35 |
| Molding shrinkage (%) | 0.34 | 0.36 | 0.32 | 0.37 | 0.43 |
| Thermal expansion ($\times 10^{-5}$/°C.) | 2.32 | 2.25 | 2.20 | 2.90 | 2.75 |
| Glass transition temperature (°C.) | 175 | 173 | 176 | 151 | 170 |
| Bending elasticity (kg/mm$^2$) | 1100 | 1120 | 1140 | 1250 | 1520 |
| Water absorption (%) | 0.43 | 0.41 | 0.40 | 0.56 | 0.47 |
| Burr (mm) | 4 | 5 | 3 | 15 | 4 |
| Adhesion | 0 | 0 | 0 | Δ | X |
| Thermal shock resistance | 0 | 0 | 0 | Δ | X |
| Solder heat resistance | 0 | 0 | 0 | X | X |

EXAMPLE 5

35 parts by weight bismaleimide triazine thermosetting polyimide resin, 4 parts by weight of the organopolysiloxane prepared in Preparation Example 5, 65 parts by weight fused quartz powder, 1 part by weight carnauba wax and 0.32 part by weight aluminum benzoate were kneaded with rollers heated to 90° C. to prepare a curable resin composition. This resin was pulverized and transfer molding was carried out for 4 min under conditions of 220° C. and 70 kg/cm$^2$. The hardened resin was post cured for 3 hours at 230° C. The various characteristics of the resulting hardened resin are shown in Table III.

COMPARATIVE EXAMPLE 5

A curable resin composition was prepared in the same manner as in Example 5 with the exception that the organopolysiloxane prepared in Preparation Example 5 was not used as it was in Example 5. This resin was cured in the same manner as in Example 5, and the various characteristics of the resulting hardened resin are shown in Table III.

TABLE III

| Characteristic | Example 5 | Comparative Example 5 |
| --- | --- | --- |
| Spiral flow (inch) | 52 | 44 |
| Bending elasticity (kg/mm²) | 980 | 1220 |
| Adhesion | 0 | X |

EXAMPLE 6

75 parts by weight orthocresol novolak epoxy resin (softening point 80° C., epoxy equivalent 220). 260 parts by weight fused silica, 1 part by weight carnauba wax, 35 parts by weight phenol novolak resin, 0.6 part by weight triphenyl phosphine and 5 parts by weight of the organopolysiloxane prepared in Preparation Example 6 were kneaded with rollers heated at 90° C. to prepare a curable resin composition. This resin was pulverized and transfer molding was carried out for 3 min under conditions of 150° C. and 70 kg/cm². The hardened resin was post cured for 4 hours at 180° C. The various characteristics of the resulting hardened resin are shown in Table IV.

EXAMPLE 7

A curable resin composition was prepared in the same manner as in Example 6, with the exception that the organopolysiloxane prepared in Preparation Example 7 was used in place of the organopolysiloxane prepared in Preparation Example 6. This resin was cured in the same manner as in Example 6, and the various characteristics of the resulting hardened resin are shown in Table IV.

COMPARATIVE EXAMPLE 6

A curable resin composition was prepared in the same manner as in Example 6 with the exception that the organopolysiloxane prepared in Preparation Example 6 was not used as it was in Example 6. This resin was cured in the same manner as in Example 6, and the various characteristics of the resulting hardened resin are shown in Table IV.

TABLE IV

| Characteristic | Example 6 | Example 7 | Comparative Example 6 |
| --- | --- | --- | --- |
| Spiral flow (inch) | 73 | 70 | 56 |
| Thermal expansion (×10⁻⁵/°C.) | 2.70 | 2.65 | 2.67 |
| Glass transition temperature (°C.) | 138 | 140 | 135 |
| Bending elasticity (kg/mm²) | 1150 | 1210 | 1420 |
| Water absorption (%) | 0.49 | 0.52 | 0.53 |
| Adhesion | 0 | 0–Δ | X |
| Thermal shock resistance | 0 | 0 | X |
| Solder heat resistance | 0 | 0 | X |

The curable resin composition of the present invention is produced by blending, as component B, an organopolysiloxane having organic groups bonded to epoxy groups, and thus has superior flowability prior to curing. In addition, the hardened resin obtained by curing the composition has superior adhesion and flexibility.

What is claimed is:

1. A curable resin composition comprising
   (A) 100 parts by weight curable resin selected from the group consisting of phenol resins, formaldehyde resins, xylene resins, xylene formaldehyde resins, ketone formaldehyde resins, furan resins, urea resins, imide resins, melamine resins, alkyd resins, unsaturated polyester resins, aniline resins, sulfonamide resins, epoxy resins, and copolymer resins thereof and mixtures thereof; and
   (B) 0.1–500 parts by weight of an organopolysiloxane having organic groups that contain epoxy groups, represented by the formula:

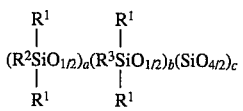

wherein $R^1$ is a univalent hydrocarbon group except $R^1$ is not an alkenyl group; $R^2$ is selected from a hydrogen atom or a univalent hydrocarbon group except $R^2$ is not an alkenyl group; $R^3$ is selected from an alkoxysilylalkyl group or an organic group that contains epoxy groups; a is selected from 0 or a positive integer; b is a positive integer; and c is a positive integer; with the proviso that a/c has the value of 0 to 4, b/c has the value of 0.05 to 4 and (a+b)/c has the value of 0.2 to 4.

2. A curable resin composition as claimed in claim 1, wherein the curable resin (A) is a curable resin selected from the group consisting of epoxy resins, phenol resins, imide resins.

3. A curable resin composition as claimed in claim 1, wherein there are 0.5 to 100 parts of (B).

4. A curable resin composition as claimed in claim 1, wherein there is additionally a filler.

5. A curable resin composition as claimed in claim 1, wherein there is additionally a curing agent.

6. A curable resin composition as claimed in claim 1, wherein there is additionally a curing accelerator.

7. A curable resin composition as claimed in claim 1, wherein there is additionally a ester-based wax.

8. The composition produced by curing the curable resin composition as claimed in claim 1.

9. A curable resin composition as claimed in claim 16 wherein said composition is capable of being cured by heat.

* * * * *